(12) United States Patent
Scherpa et al.

(10) Patent No.: US 9,288,166 B2
(45) Date of Patent: Mar. 15, 2016

(54) PRESERVING COLLABORATION HISTORY WITH RELEVANT CONTEXTUAL INFORMATION

(71) Applicant: INTERNATIONAL BUSINESS MACHINES CORPORATION, Armonk, NY (US)

(72) Inventors: Josef A. Scherpa, Fort Collins, CO (US); Tracee L. Wolf, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 443 days.

(21) Appl. No.: 13/621,869

(22) Filed: Sep. 18, 2012

(65) Prior Publication Data

US 2014/0082096 A1    Mar. 20, 2014

(51) Int. Cl.

| G06F 15/16 | (2006.01) |
|---|---|
| H04L 12/58 | (2006.01) |
| H04L 29/06 | (2006.01) |
| H04L 12/18 | (2006.01) |
| G06Q 10/10 | (2012.01) |
| G06Q 30/02 | (2012.01) |

(52) U.S. Cl.
CPC ............ H04L 51/04 (2013.01); H04L 12/1831 (2013.01); H04L 51/046 (2013.01); H04L 51/16 (2013.01); H04L 65/403 (2013.01); G06Q 10/10 (2013.01); G06Q 10/107 (2013.01); G06Q 30/02 (2013.01)

(58) Field of Classification Search
None
See application file for complete search history.

(56) References Cited

U.S. PATENT DOCUMENTS

| 7,284,202 B1 * | 10/2007 | Zenith | G06F 17/30035 |
|---|---|---|---|
| | | | 348/E7.071 |
| 7,856,469 B2 * | 12/2010 | Chen | H04L 12/1831 |
| | | | 709/203 |
| 7,953,608 B2 * | 5/2011 | McCallie, Jr. | G06Q 10/10 |
| | | | 434/236 |
| 2004/0186721 A1 | 9/2004 | Beynon et al. | |
| 2009/0043848 A1 * | 2/2009 | Kordun | H04L 51/04 |
| | | | 709/205 |
| 2009/0144366 A1 * | 6/2009 | Lyle | G06Q 10/107 |
| | | | 709/204 |
| 2010/0005142 A1 * | 1/2010 | Xiao | G06Q 10/10 |
| | | | 709/204 |
| 2010/0180001 A1 | 7/2010 | Hardt | |
| 2011/0246920 A1 * | 10/2011 | Lebrun | G06Q 30/02 |
| | | | 715/769 |
| 2013/0080927 A1 * | 3/2013 | Weaver | G06Q 10/10 |
| | | | 715/758 |
| 2013/0115927 A1 * | 5/2013 | Gruber | H04W 4/16 |
| | | | 455/414.1 |
| 2013/0332536 A1 * | 12/2013 | Kho | H04L 65/403 |
| | | | 709/205 |

OTHER PUBLICATIONS

Jones, S., "Context-Aware Messaging: How Personal, Spatial and Temporal Constraints Affect Text-Based Communication," MUM 2009, Proc. of 8th Int'l. Conf. on Mobile and Ubiquitous Mutlimedia, Art. No. 8, ACM, 2009, 10 pgs.

* cited by examiner

Primary Examiner — Ranodhi Serrao
Assistant Examiner — James Fiorillo
(74) Attorney, Agent, or Firm — Cuenot, Forsythe & Kim, LLC

(57) ABSTRACT

Preserving collaborative history includes detecting a trigger for a chat session between at least two participants using a processor and, responsive to the trigger, obtaining event data for an event occurring during the chat session and involving at least one of the participants. The event data is included within a transcript of the chat session. In other cases, event data is obtained from external systems that is correlated with the chat session and is included within the transcript.

14 Claims, 3 Drawing Sheets

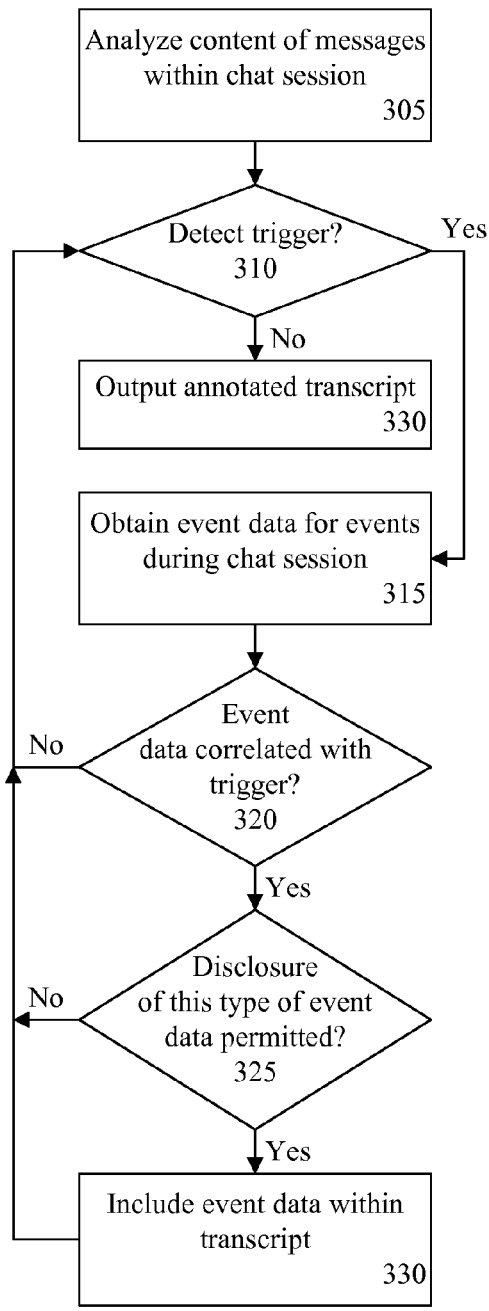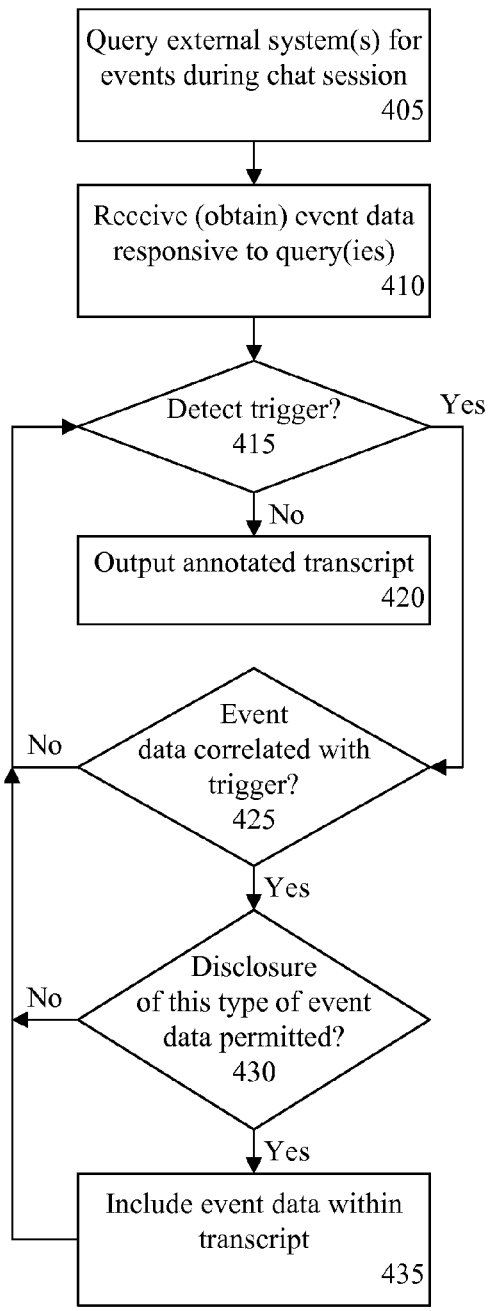
FIG. 3
FIG. 4

500

| 1 | 2 | 3 |
|---|---|---|
| Jane | 8:00 AM | Bill, can you join us in meeting room b? |
| Event | - | Jane currently attending: Product Planning E-Meeting |
| Event | - | Jane's badge scanned into meeting room B |
| Bill | 8:01 AM | No, but I'll stay on the call and the e-meeting. |
| Bill | 8:07 AM | Jane, can you follow up on that? I'll create a task. |
| Event | - | E-meeting task created: task link |
| Jane | 8:08 AM | Sure, I can do it. |
| Bill | 8:10 AM | See you later. |
| Event | - | Bill and Jane: Dialed into 555-555-1122 (Kathy's conference call number) |
| Event | - | Kathy currently hosting: Sales Proposal Meeting |
| Jane | 12:00 PM | Hi again. It looks like we are both working on this now? |
| Bill | 12:05 PM | You excited to be a part of the team? |
| Jane | 12:06 PM | Definitely. This should be fun. Want to meet to review these slides? |
| Event | - | Kathy is presenting: Salesupdate.pdf |
| Jane | 12:20 PM | You still there? |
| Event | 12:21 PM | Jane scanned her badge into the cafeteria. |
| Bill | 1:05 PM | Surprised the discussion about this topic is still ongoing. |
| Event | - | Bill and Jane are both watching John Doe screen sharing "sales_results.pdf" |
| Bill | 2:00 PM | Thanks for joining the call on such short notice. |
| Event | - | Bill currently attending: Customer Review Meeting |
| Event | - | Bill and Jane dialed into 555-555-1133 (Bill's conference call number) |
| Jane | 2:02 PM | My pleasure. |
| Event | - | Broadcast instant message: Emergency – all hands meet in the cafeteria |
| Bill | 3:03 PM | Jane, something came up. I have to run. See you later. |
| Jane | 3:04 PM | Yes, I got the alert also. I'll see you down there. |

PRESERVING COLLABORATION HISTORY WITH RELEVANT CONTEXTUAL INFORMATION

BACKGROUND

Within various social and/or work environments, individuals are often organized into teams or groups. Members of a team frequently communicate throughout the day regarding a variety of different topics. While the form of communication used can vary, in many cases members communicate by way of a collaborative session such as a chat or instant messaging session while participating in one or more other collaborative activities such as electronic meetings, conference calls, or the like. The chat session becomes a secondary, or "back," channel that may be on-going throughout the day and one that takes place concurrently with the other noted activities to facilitate multitasking.

When a chat session runs concurrently with one or more other activities, the transcript of the chat session often includes general references by the participants to the other concurrent activities. Without information relating to those activities, the actual transcript of the chat session may be difficult to read and include ambiguous references to activities occurring outside of the chat session. As such, the chat transcript may have little explanatory value as to the subject matter discussed when read days, weeks, or months after the fact.

BRIEF SUMMARY

An embodiment can include a method. The method includes detecting a trigger in a chat session between at least two participants using a processor and, responsive to the trigger, obtaining event data for an event occurring during the chat session and involving at least one of the participants. The event data is included within a transcript of the chat session.

Another embodiment can include a method. The method can include identifying participants involved in a chat session, detecting an event occurring during the chat session and external to the chat session in which at least one participant is involved using a processor, and obtaining event data for the event. The event data is included in a transcript of the chat session.

Another embodiment can include a system. The system includes a processor. The processor is configured to initiate executable operations including detecting a trigger in a chat session between at least two participants and, responsive to the trigger, obtaining event data for an event occurring during the chat session and involving at least one of the participants. The event data is included within a transcript of the chat session.

Another embodiment can include a computer program product. The computer program product includes a computer-readable storage medium having stored thereon program code that, when executed, configures a processor to perform operations. The operations include detecting a trigger within a chat session between at least two participants and, responsive to the trigger, obtaining event data for an event occurring during the chat session and involving at least one of the participants. The event data is included within a transcript of the chat session.

BRIEF DESCRIPTION OF THE SEVERAL VIEWS OF THE DRAWINGS

FIG. 3 is a flow chart illustrating an exemplary method of preserving a collaboration history including relevant contextual information.

FIG. 4 is a flow chart illustrating an exemplary method of preserving a collaboration history including relevant contextual information.

FIG. 5 is an example of an annotated transcript for a collaborative session.

DETAILED DESCRIPTION

Figure 1:
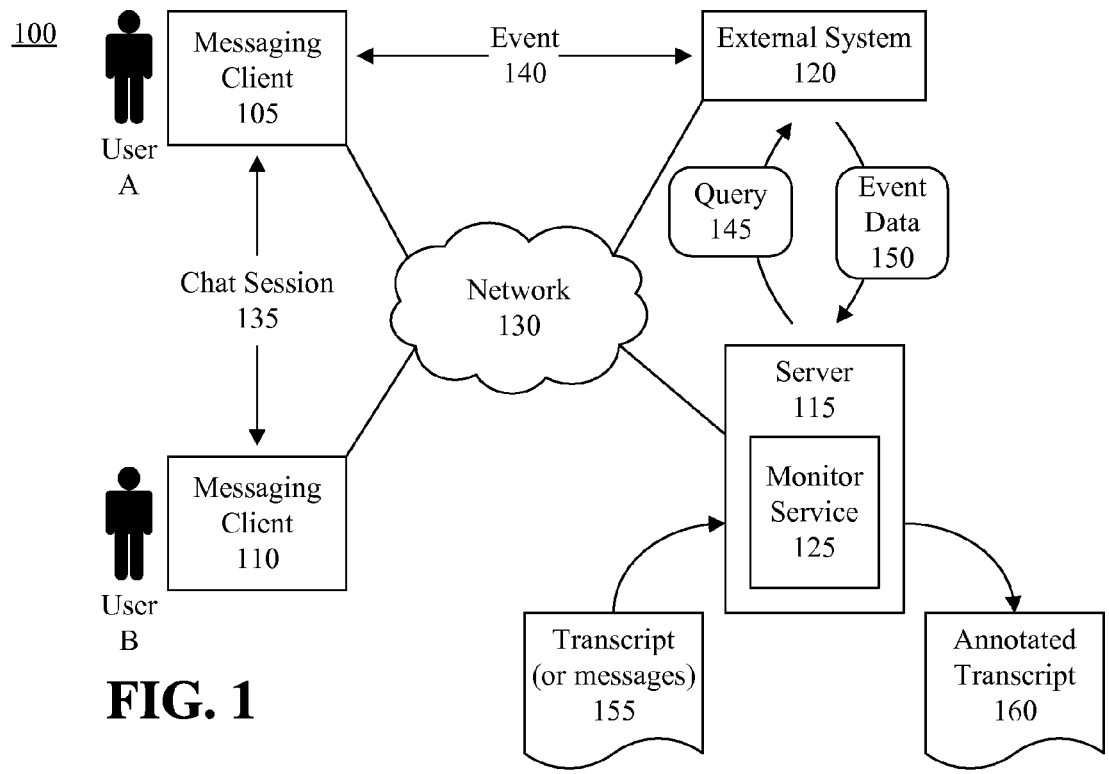
FIG. 1 is a block diagram illustrating an example of a communication system having a monitor service.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

One or more embodiments relate to preserving a collaboration history with relevant contextual information included therein. In accordance with the inventive arrangements disclosed within this specification, a transcript of a chat session is annotated with data relating to events that are determined to be contextually relevant to the chat session.

Responsive to various triggers detected within a chat session and/or external to, and concurrent with the chat session (e.g., other collaborative activities), one or more events can be identified that are correlated with the chat session. Event data for the identified events is collected and included within a transcript of the chat session. The event data for the event can be included within the transcript in association with the particular trigger with which the event is correlated and/or at the correct chronological time.

The transcript, in annotated form, is stored or otherwise persisted and available for review at a later time. The annotations provide contextual data that is useful in deciphering and understanding the subject matter discussed between the participants in the transcript. The event data provides explanatory value and context otherwise lacking from the transcript of the chat session.

FIG. 1 is a block diagram illustrating an example of a communication system 100 having a monitor service 125. As shown, communication system 100 includes messaging clients 105 and 110, a server 115 executing a monitor service 125, and one or more external systems collectively represented as external system 120. Messaging clients 105 and 110, server 115, and external system 120 are communicatively linked through a network 130. Network 130 can be implemented as, or include, any of a variety of different networks such as, for example, a WAN, a LAN, a wireless network, a mobile network, a Virtual Private Network (VPN), the Internet, or the like.

Each of messaging clients 105 and 110 is implemented as a data processing system, whether a computer such as a laptop, a desktop, a tablet, a mobile communication device such as a mobile phone, or the like. Messaging clients 105 and 110 execute suitable operational software such as an operating system and a client-side messaging application that enables participation in a chat session 135. A chat session refers to a synchronous exchange of messages between two or more users (messaging clients) that takes place in substantially real-time so as to have the effect of immediate delivery of messages between clients as opposed to electronic mail, for example. As used herein, the term "real time" means a level of processing responsiveness that a user or system senses as sufficiently immediate for a particular process or determination to be made, or that enables the processor to keep up with some external process.

Server 115 executes suitable operational software, e.g., an operating system, and further can execute a server-side messaging application that allows server 115 to route messages (e.g., text messages, instant messages, Multimedia Messaging Service messages, or the like) exchanged between user A of messaging client 105 and user B of messaging client 110 as part of chat session 135.

From time-to-time within this specification, reference to a message client, such as any of messaging clients 105 and 110, may also refer to, or reference, the particular user of that client, e.g., user A and user B, respectively. A "user" refers to a human being that operates or uses a particular data processing system such as one of messaging clients 105 and 110. Similarly, reference to a user may also refer to, or reference, the messaging client used by that user. For example, when user A sends a message to user B as part of chat session 135, it is understood that a message is sent from messaging client 105 to messaging client 110 by way of network 130 and server 115.

Server 115 also executes a monitor service 125. In one example, monitor service 125, as executed by server 115, is able to analyze the content of messages sent between messaging client 105 and messaging client 110 as part of chat session 135. In executing monitor service 125 and facilitating chat session 135, server 115 is configured to detect triggers within chat session 135. In another example, server 115 is configured to detect a trigger by monitoring activities in one or more systems such as external system 120. In still another example, that server 115 is configured to detect triggers both within chat session 135 and may occur in external system 120.

In one aspect, the detection of triggers and further processing described within this specification to determine events and event data is performed in real time or in substantially real time as chat session 135 is ongoing. In another aspect, the detection of triggers and further processing described within this specification to determine events and event data is performed in an off-line manner, e.g., after chat session 135.

In operation, user A of messaging client 105 and user B of messaging client 110 are involved in chat session 135. One or more additional users (not shown) also can be involved in chat session 135. For purposes of illustration, however, only two users are illustrated as participating in chat session 135 and, as such, are referred to as "participants." Chat session 135 involves the exchange of a variety of different messages that can take place over an extended period of time.

During chat session 135, either user A, user B, or both of users A and B can be involved in one or more other activities including, for example, other collaborative sessions. An activity is an external activity when that activity occurs independently of chat session 135. One example of an activity that can be external is a collaborative session other than chat session 135. A "collaborative session" refers to a form of communication that takes place using a communication network in which each participant communicates via a suitable communication client that is communicatively linked to the network. Examples of collaborative sessions include, but are not limited to, a teleconference, an electronic meeting (e-meeting, e.g., a Web-based meeting that can include audio and largely involves sharing desktops and/or applications from one's computer system), a chat session, etc.

The other, or external, activities in which user A, user B, and/or users A and B are involved take place concurrently with chat session 135. For example, user A is taking part in another activity that is independent of chat session 135 such as a different collaborative session that involves external system 120. The activity can be a telephone or conference call, an e-meeting, or the like. External system 120 is a system that supports or facilitates the activity. For example, external system 120 can be a teleconferencing system, an e-meeting system, a security system, or the like. In any case, external system 120 is separate and independent of server 115 (and, as such, the chat and/or collaboration system that supports chat session 135).

Due to user A's involvement in an activity supported by external system 120, one or more events are generated such as event 140. Event 140 will vary in accordance with the particular type of external system 120. When external system 120 is a teleconferencing system, examples of event 140 include user A calling into the teleconference system, user A disconnecting from the teleconference system, etc. When external system 120 is an e-meeting system, examples of event 140 include user A connecting and/or disconnecting from the e-meeting, a change of speaker in the e-meeting, a task or other item generated during the e-meeting, a file presented during the e-meeting, etc. When external system 120 is a security system, examples of event 140 include user A entering a particular room as may be detected when user A scans or swipes a badge to unlock a door.

It should be appreciated that the different types of external system 120 and different types of event 140 discussed are provided for purposes of illustration only. The examples provided are not intended to be limiting. Event 140 can be an event from a collaborative activity or simply an activity, e.g., user A using a badge to enter a particular location. In any case, event 140 can be persisted or stored within external system 120. As external system 120 can be queried by server 115, server 115 can query external system 120 for event information for event 140 during chat session 135 or after chat session 135.

In one aspect, server 115 monitors the content of messages exchanged between user A and user B as part of chat session 135. Appreciably, since server 115 is responsible for sending messages between user A and user B, server 115 has possession of each message sent as part of chat session 135. The messages that are sent as part of chat session 135 collectively form transcript 155. Server 115 detects one or more triggers within transcript 155. As noted, server 115 detects triggers in real time by analyzing messages when sent or by analyzing transcript 155 after the fact, e.g., after chat session 135.

A trigger detected within transcript 155 is detected based upon the content of messages and/or, in some cases, the lack of messages exchanged between participants. In one aspect, a trigger is an indication of an ambiguity within a message of chat session 135 for which additional information is needed to provide additional context to the ambiguity or resolve the ambiguity. The additional information that is needed is event data relating to an event such as event 140 that involves one or more of the participants of chat session 135.

In another aspect, server 115 monitors one or more different external systems for events that take place involving one or more of the participants of chat session 135. In that case, the trigger can be the occurrence of an event in an external system that involves a participant of chat session 135. For example, server 115 queries external system 120 for events involving user A and/or user B. The trigger is the detection of an external activity, such as a collaboration session, that is independent of chat session 135, but that involves a minimum number "N" participants of chat session 135, where "N" is an integer number such as 1, 2, 3, etc.

Responsive to detecting a trigger in chat session 135, server 115 queries one or more external systems such as external system 120. It should be appreciated that server 115 can query more than one external system to obtain event data for events that take place during chat session 135 and which involve one or more participants of chat session 135 (user A and/or user B). The particular external system that has useful event data, for example, may not be known a priori, but rather determined from event data, if any, returned to server 115 responsive to the query. In another aspect, however, server 115 does determine a particular external system from a plurality of external systems to query based upon an analysis of the messages exchanged as part of chat session 135.

As illustrated, when a trigger is detected through analysis of one or more messages of chat session 135, server 115 sends a query 145 to external system 120. Query 145 asks for event data for any event associated with user A, user B, or both users A and B. Query 145 also can specify a time frame of interest or window during which any such event would have taken place. This allows server 115 to limit the query to the time frame either in an around the time of the detected trigger or limit the query to the time frame during which chat session 135 took (or takes) place.

External system 120 locates any events matching query 145 and sends event data 150 to server 115. Server 115 determines relevance of the received event data to the trigger or chat session 135. When server 115 determines that event data 150 is relevant, or correlated, with the trigger and/or chat session 135, server 115 includes event data 150 within transcript 155 to generate annotated transcript 160. In one aspect, however, obtaining event data that matches query 145 can be considered relevant to chat session 135 automatically.

In the case where the trigger is the detection of an activity in which one or more of the participants of chat session 135, are participating concurrently with chat session 135, server 115 can simply send a query for event data to external systems from time-to-time throughout chat session 135, periodically throughout chat session 135, and/or after chat session 135 has ended. As such, event data need not be retrieved responsive to a detected trigger within chat session 135 itself.

Annotated transcript 160 provides additional information in the form of the event data to lend meaning to vague references to activities that one or more of the participants are involved in during chat session 135 Annotated transcript 160, through inclusion of the event data, can reference actions or content that a participant is to follow-up on or that was discussed in an external and concurrent collaborative session supported by external system 120. Event data 150 included within annotated transcript 160 clarifies the context of the remarks made in chat session 135.

Figure 2:
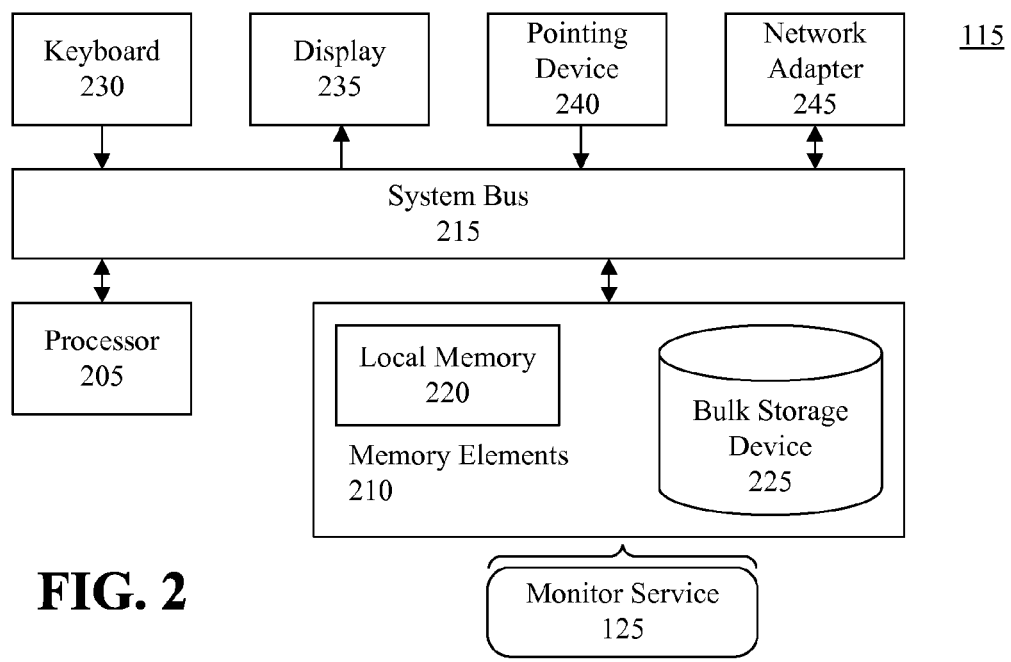
FIG. 2 is a block diagram illustrating an example of a server executing a monitor service.

FIG. 2 is a block diagram illustrating an example of server 115 executing monitor service 125. As noted, server 115 is implemented as a data processing system or programmable data processing apparatus. As such, server 115 includes at least one processor 205 such as a central processing unit coupled to memory elements 210 through a system bus 215 or other suitable circuitry. Server 115 can store program code within memory elements 210. Processor 205 executes the program code accessed from memory elements 210 via system bus 215. In one aspect, for example, server 115 is implemented as a computer that is suitable for storing and/or executing program code. It should be appreciated, however, that server 115 can be implemented in the form of any system including a processor and memory that is capable of performing the functions and/or operations described within this specification.

Memory elements 210 can include one or more physical memory devices such as, for example, local memory 220 and one or more bulk storage devices 225. Local memory 220 refers to RAM or other non-persistent memory device(s) generally used during actual execution of the program code. Bulk storage device(s) 225 can be implemented as a hard disk drive (HDD), solid state drive (SSD), or other persistent data storage device. Server 115 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to server 115. The I/O devices can be coupled to server 115 either directly or through intervening I/O controllers. One or more network adapters 245 also can be coupled to server 115 to enable server 115 to become coupled to other systems, computer systems, remote printers, and/or remote storage devices through intervening private or public networks. Modems, cable modems, and Ethernet cards are examples of different types of network adapters 245 that can be used with server 115.

As pictured in FIG. 2, memory elements 210 can store monitor service 125. Monitor service 125, being implemented in the form of executable program code, is executed by server 115 and, as such, is considered part of server 115. Server 115, executing monitor service 125, can detect triggers for chat sessions, collect event data, determine relevance and/or correlations between the event data and the chat session, and generate an annotated transcript as described within this specification. The annotated transcript is output to, and stored within, memory elements 210. As used herein, "outputting" and/or "output" can mean storing in memory elements 210, for example, writing to a file stored in memory elements 210, writing to display 235 or other peripheral output device, sending or transmitting to another system, exporting, or the like.

FIG. 3 is a flow chart illustrating an exemplary method 300 of preserving a collaboration history including relevant contextual information. Method 300 illustrates an example in which the triggers that are detected are determined from the text of messages exchanged as part of the chat session. Method 300 can be performed by a server within a computing environment as described with reference to FIGS. 1 and 2. While FIG. 3 illustrates a method in which a transcript for a chat session is evaluated after the fact, in another aspect, and as noted, method 300 can be performed in real time as messages are exchanged between participants in the chat session.

In block 305, the server analyzes the content of one or more messages, e.g., the transcript, of the chat session between two or more users. The server uses various processing techniques to determine whether a trigger is within, or can be derived from, the messages. In one example, the server applies natural language processing to the messages. Natural language processing can include, locating particular words, e.g., keywords and/or phrases, recognizing grammatical construction of text and individual words, or the like.

The server, for example, uses natural language processing to determine whether any message, e.g., the text of the message, includes an ambiguity. The ambiguity is interpreted as a trigger. Examples of ambiguities within the chat session that are interpreted as ambiguities include, but are not limited to, pronouns of various types such as he, she, it, they, them, etc. In another example, the server searches for one or more keywords within the content of the messages.

Other examples of detectable triggers within message text include phrases indicative of the occurrence of an event. Phrases such as "just a minute," "be right back," etc., are often indicative of the occurrence of an event such as the phone ringing or the participant attempting to perform a task such as joining an e-meeting or a teleconference. The server can interpret such phrases as triggers indicating that one or more queries directed to external systems should be performed.

Further natural language processing techniques may be applied individually and/or in combination to detect triggers and/or to determine relevancy (correlation) of event data to the chat session in deciding whether event data is to be included within a transcript. The examples include co-reference resolution including anaphora resolution, named entity recognition (NER), relationship extraction, and word sense disambiguation. Such techniques are generally known in the art, but are described in general terms herein.

Coreference resolution refers to processing a sentence or larger chunk of text and determining which words refer to the same objects. Anaphora resolution refers to a specific example of this task and relates to matching up pronouns with the nouns or names to which the pronouns or nouns refer. NER refers to the processing of a stream of text to determine which items in the text map to proper names, such as people or places, and what the type of each such name is in terms of being a person, location, or organization, for example.

Relationship extraction refers to processing a chunk of text and identifying the relationships among named entities such as who the supervisor of whom is, who the relative of whom is. Word sense disambiguation refers to processing portion of text to determine which of a plurality of potential meanings is most correct or makes the most sense in the context of the chat session or messages.

Still another trigger that the server can detect within a chat session is the lack of messages being exchanged. A minimum amount of time in which no messages are exchanged between participants can be considered a trigger that causes the server to query for event data.

In block 310, the server determines whether a trigger is detected within a message of the chat session. If so, method 300 continues to step 315. If not, method 300 proceeds to block 330, where the server outputs the annotated transcript (or the transcript without annotation if no event data is obtained). The annotated transcript can be stored for future reference.

In block 315, the server obtains event data for one or more events. In one aspect, the events for which event data is obtained include any that occurred during the chat session. In another aspect, the events for which event data is obtained include those that occurred at the time of the trigger, within a predetermined amount of time prior to the time of the trigger, within a predetermined amount of time after the trigger, or any combination thereof.

For example, responsive to detecting a trigger, the time at which the trigger occurred is determined as the time of the message including the trigger. Responsive to detecting the trigger, the server sends a request to one or more external systems. The server effectively queries any external systems coupled with the server asking for events associated with one or more of the participants of the chat session that occurred within a period of time as discussed and as specified by the request. The server then receives any event data matching the request from the external system(s) that received a request.

In block 320, the server determines whether the event data is correlated with the trigger. In one aspect, when event data is received that involves at least one participant of the chat session within the enumerated period of time, the server determines that the event data is correlated with the trigger. In another aspect, when event data is received that involves at least two participants of the chat session within the enumerated period of time, the server determines that the event data is correlated with the trigger. The various natural language processing techniques also can be applied to determine whether the event data is correlated with the chat session. If the event data is determined to be correlated with the trigger, method 300 continues to block 325. If not, method 300 loops back to block 310.

In some cases, an external system is configured to provide the specific information requested by the server. In such cases, for example, the server can interpret the event data to be relevant to the chat session, e.g., the event data is within the time frame enumerated by the request and involves one or more enumerated participants. In other cases, however, the external system may provide more generic event data. In that case, the server is configured to determine relevancy of the event data by analyzing the time of the event data, e.g., the time stamp, and/or whether the event data is for one or more participants of the chat session.

In block 325, the server determines whether disclosure of the type of event data obtained in block 315 is permitted. Block 325 can be an optional processing step that can be implemented to ensure a level of privacy for participants. In one aspect, each participant can specify one or more preferences indicating the type of event data that he or she is allowing to be shared and, as such, included within an annotated transcript. The interface through which the participant can set the parameters indicating sharing preferences can be incorporated into the messaging client, available via a browser based interface for the server, or the like. In any case, the participant can specify which types of events and, as such, event data, the participant is allowing to be shared and included within an annotated transcript. These preferences are made available to the server for making determinations as to whether permission has been granted by the participant(s) with which the event data is associated or to which the event data pertains for inclusion in the annotated transcript.

For example, if the event data pertains to only one participant, e.g., user A entering the cafeteria, then permission for including the event data need only be determined for this type of event data and for user A. If the event data is for user A and user B both being on a conference call, permission would be required from each user for this type of event data. Otherwise, for example, the event data included in the transcript can be modified by the server to relate only to the user that provided permission. For example, the event data would indicate that user A (having provided permission) joined a conference call and not indicate that user B (not having provided permission) joined the same conference call. If neither user A nor user B has provided permission, then the event data would not be included in the transcript at all.

Accordingly, in block 325, the server can determine the particular participant(s) which whom the event and event data is correlated and determine whether the participant given permission to disclose or share the particular type of event data in question. If so, method 300 continues to block 330. If not, method 300 loops back to block 310.

In block 330, the server includes the event data for which participants have given permission to disclose within the transcript, resulting in an annotated transcript. The event data is inserted in the transcript in association with the detected trigger. In one aspect, the event data is included in the transcript in chronological order with the messages included therein. Accordingly, the event data, having a time stamp, is incorporated into the transcript in chronological order with the chronologically ordered messages included therein. After block 330, method 300 loops back to block 310 to continue processing.

FIG. 4 is a flow chart illustrating an exemplary method 400 of preserving a collaboration history including relevant contextual information. Method 400 illustrates an example in which the trigger(s) for the chat session are not detected using the text of exchanged messages, but rather from the external systems themselves. In any case, method 400 can be performed by a server within a computing environment as described with reference to FIGS. 1 and 2. While FIG. 4 illustrates a technique in which a transcript for a chat session is evaluated after the fact, in another aspect, and as noted, method 400 can be performed in real time as messages are exchanged between participants in the chat session. As noted, the server can query external systems from time-to-time, periodically, or the like.

Method 400 can begin in a state where the chat session, e.g., a transcript, is selected or identified and the participants of the chat session also have been identified. Accordingly, in block 405, the server queries one or more external systems for events that took place during the chat session (e.g., within an enumerated time frame corresponding to the chat session). In one aspect, the server queries the external system(s) for events involving one or more of the participants of the chat session. As noted, the external system may or may not be able to understand a query for event data relating to particular users. In the case where the external system does not understand such a query, the server can evaluate the received event data to determine whether the event data includes or relates to one or more participants of the chat session. In block 410, the server receives any event data from the external system(s) responsive to the query(ies) that were issued.

In block 415, the server determines whether a trigger is detected within the received event data. As discussed, in one aspect, the server determines whether a minimum number of participants N of the chat session are involved in an external activity, e.g., a same external activity, concurrently with the chat session. If so, method 400 continues to step 425. If not, method 400 proceeds to block 420, where the server outputs the annotated transcript. The annotated transcript can be stored for future reference.

In block 425, the server optionally determines whether the event data is correlated with the trigger. Correlation can be determined, for example, by determining whether the event data provides explanatory value to a term located within the transcript, e.g., answers a detected ambiguity. The various natural language processing techniques described herein, for example, can be applied to determine whether event data is correlated with the chat session. In another aspect, the event data can be presumed to be correlated, particularly when some minimum number of participants is also involved in another same activity concurrently with the chat session. If the event data is determined to be correlated to the transcript or a message included therein, method 400 continues to block 430. If not, method 400 loops back to block 415.

In block 430, the server (optionally) determines whether disclosure of the type of event data obtained in block 410 is permitted. The server can determine the particular participant with whom each event and corresponding event data is associated and determine whether the participant has allowed disclosure of the event data. If so, method 400 can continue to block 435. If not, method 400 can loop back to block 415.

In block 435, the server includes the event data for which participant have given permission for disclosure within the transcript, resulting in an annotated transcript. The event data is inserted in the transcript in the transcript in chronological order with the messages included therein. The event data also can be inserted into the transcript before or after, e.g., immediately before or after, a message that includes an ambiguity that the event data clarifies. After block 435, method 400 loops back to block 415 to continue processing.

As discussed, the techniques illustrated in FIGS. 3 and 4 can be performed concurrently in that the server can detect triggers within the chat session itself or detect triggers from a review of event data that is collected.

FIG. 5 is an example of an annotated transcript 500 for a chat session. Annotated transcript 500 is generated by server 115 as described Annotated transcript 500 includes a plurality of columns labeled 1, 2, and 3, for purposes of illustration. Column 1 indicates whether a row corresponds to a message sent from a user, in this case user Jane or user Bill, or is event data which is indicated as "Event." Column 2 includes time stamps. The time stamp also can specify a date, but is not shown for purposes of clarity and ease of illustration. In some cases, a time stamp is not illustrated for an event, while a time stamp is in other cases. It should be appreciated that any event includes time stamp information allowing event data for that event to be incorporated into annotated transcript 500 in chronological order with the various messages also included therein. Column 3 includes the actual text of a message sent as part of the chat session or, in the case of an event, event data describing the event.

Annotated transcript 500 illustrates various different triggers and the particular event data determined responsive to detecting the trigger Annotated transcript begins with a first message from Jane at 8:00 AM. At this time, both Jane and Bill are participating in the Product Planning E-Meeting concurrently with the chat session.

At 8:00 AM, Jane asks Bill, "can you join us in meeting room b?" The server detects the trigger "meeting room b," which is a location, e.g., a physical location. For example, one or more locations such as meeting rooms can be designated as keywords and/or a keyword phrase that the server detects as a trigger. Responsive to detecting the trigger "meeting room b," the server requests event data from one or more external systems such as the e-meeting system, the security system, etc. As noted, the server can query a plurality of different systems for event data.

The server receives event data indicating that Jane is currently attending the Product Planning E-Meeting from the e-meeting system and that Jane's badge has been scanned into meeting room B from the security system. The event data indicating that Jane is participating in the "Product Planning E-Meeting" is included in annotated transcript 500 in association with the trigger, e.g., following the message in which the trigger is detected. Correlation of the event data to the chat session is determined by the fact that Jane's badge was scanned into the same location referred to in a message of the chat session and/or by virtue of the fact that the event data is for Jane. The event data that Jane's badge has been scanned into meeting room B is included in annotated transcript following the message including the trigger. Appreciably, by including the event data following (or immediately preceding) the message including the trigger, the event data is chronologically ordered with respect to the messages of the annotated transcript. Correlation of the external collaborative session (the Product Planning E-Meeting) is determined since the e-meeting involves Jane.

The next event is the creation of a task and event data for creation of the task is included following the message in which Bill asks whether Jane can follow up on "that" and further states "I'll create a task." The server detects the statement about creating a task and also can detect the term "that" both as triggers or as a single trigger (e.g., by natural language processing and/or keyword search). The server queries the external systems to obtain the event data that is included within annotated transcript 500. In one aspect, given the meaning of the message and the explicit statement about the task, the server can query a particular external system, e.g., the e-meeting system, as opposed to more than one or all of the external systems that may be registered with the server.

In this particular example, the event data includes a link, e.g., a hyperlink, referencing the particular task that has been created during the e-meeting or within a project planning system. When the link is selected within annotated transcript 500, the task can be opened, e.g., within another suitable program.

Later in the day, the server detects another type of trigger that is not dependent upon the content of a message, but which is determined from the chat session. In this example, the chat session is ongoing despite no messages being exchanged. As noted, a trigger that can be detected is the lack of messages being exchanged for a minimum amount of time. The server, responsive to detecting the lack of message exchange, detects that both participants of the chat session have engaged in, or are engaging in, a same activity, e.g., joining a same conference call or calling a same conference call telephone number. Accordingly, the event data is included in annotated transcript 500 at the correct time in chronological order.

At 12:06 PM, Jane asks whether Bill would like to meet to "review these slides". In this instance, both Bill and Jane are participating in a conference call and viewing slides in an e-meeting. In one aspect, the server determines that the term "slides" is a trigger that causes the server to query for event data. In another example, the server is monitoring and querying the external systems and determines that both Bill and Jane are engaged in a same activity. In either case, the server determines the particular file that is being shared within the e-meeting that both Bill and Jane are attending via the query submitted to the e-meeting system. The event data indicating the slide being shown and the presenter is included within annotated transcript 500.

At 12:21 PM, event data indicating that Jane has scanned her badge into the cafeteria is obtained from the security system and included within annotated transcript 500. The event data included at 12:21 can be included responsive to the detection a trigger which, in this case, is a lack of exchanged messages, e.g., a pause, in the chat session. As noted, in situations where no messages are exchanged between participants of the chat session for at least a minimum amount of time, the server can query for events in and around that time frame, e.g., the time frame corresponding to the pause, to determine whether any events involving one or more participants have been detected. In this example, the event is only correlated with the chat session (e.g., relevant) due to the detected pause in messages. Accordingly, as illustrated, the pause is augmented with event data relating to a detected event for one of the participants. While not directly related to the chat session, the event (and corresponding event data), is explanatory of the detected pause in the chat session, e.g., a participant physically moving from one location to another.

In the message from Bill at 1:05 PM, the server detects the term "this" in relation to "topic." The server queries one or more systems and determines that Bill and Jane are both attending an e-meeting and viewing the file "sales_results.pdr" as presented from the screen of John Doe. The event data is included in annotated transcript 500. Though not illustrated, in another example, a thumbnail view or other preview of the file is presented within annotated transcript. Further, a link to the file can be included in the transcript.

In the message from Bill at 2:00 PM, the server detects the phrase "the call" and queries one or more external systems including the conference call system. The server determines that both Bill and Jane are attending the "Customer Review Meeting" and that both are also dialed into Bill's conference call number. The event data is included within annotated transcript 500.

Subsequently, an instant message is broadcast to multiple members of a team or group of which both Bill and Jane are members. Because the message was sent to both Bill and Jane, event data describing the message and the content of the message itself is included within annotated transcript 500. In this example, the same message is sent to both participants and is, therefore, correlated with the chat session.

While FIG. 5 includes columns indicating whether the text is message text (i.e., text of messages of the chat session) or event data that has been included in annotated transcript 500, in other examples, the included event data can be visually distinguished from conversation text using other mechanisms. Any of a variety of different mechanism for displaying text or other information and visually distinguishing event data from message text can be used or applied. For example, Rich Text formatting, e.g., color, different fonts, highlighting, or the like, can be used.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A system comprising:
a server further comprising at least one processor coupled to at least one memory and communicatively linked through a network to one or more external systems;
wherein the server is further configured to initiate executable operations comprising:
monitoring a chat session between at least two participants communicating over the network;
analyzing the content sent between the at least two participants;
creating a transcript describing the content sent between the at least two participants;
detecting a trigger in the chat session between the at least two participants, wherein the trigger is detected from at least one of the chat session or from the one or more external systems communicatively linked through the network;
responsive to the trigger, identifying an event that is correlated with the chat session, wherein the event is included in the transcript;
obtaining event data for the event occurring during the chat session and involving at least one of the participants; wherein the event data is obtained by at least one of an analysis of the messages exchanged as part of the chat session or from a query to the one of more external systems;
including the event data within an annotated transcript of the chat session; and
storing the annotated transcript for review.

2. The system of claim 1, wherein the trigger is derived from a message sent from a first participant to a second participant of the chat session.

3. The system of claim 1, wherein the trigger is a minimum amount of time in which no messages are exchanged between the at least two participants.

4. The system of claim 1, wherein the event data is visually distinguished from messages within the annotated transcript.

5. The system of claim 1, wherein the event data is included within the transcript only responsive to determining that a participant of the chat session associated with the event data provided permission to disclose the event data.

6. The system of claim 1, wherein the chat session is conducted by a messaging system and the event occurs within a different system from which the event data is obtained, wherein the server is further configured to initiate an executable operation comprising querying the different system for the event data.

7. The system of claim 1, wherein the event data included within the transcript comprises a link to the event.

8. The system of claim 1, wherein the event data is included within the transcript in chronological order.

9. A computer program product, comprising:
a computer-readable storage memory having stored thereon program code that, when executed, configures:
a server further comprising at least one processor coupled to at least one memory and communicatively linked through a network to one or more external systems;
wherein the server is further configured to initiate executable operations comprising:
monitoring a chat session between at least two participants communicating over the network;
analyzing the content sent between the at least two participants;
creating a transcript describing the content sent between the at least two participants;
detecting a trigger in the chat session between the at least two participants, wherein the trigger is detected from at least one of the chat session or from the one or more external systems communicatively linked through the network;
responsive to the trigger, identifying an event that is correlated with the chat session, wherein the event is included in the transcript;
obtaining event data for the event occurring during the chat session and involving at least one of the participants; wherein the event data is obtained by at least one of an analysis of the messages exchanged as part of the chat session or from a query to the one of more external systems;
including the event data within an annotated transcript of the chat session; and
storing the annotated transcript for review.

10. The computer program product of claim 9, wherein the trigger is derived from a message sent from a first participant to a second participant of the chat session.

11. The computer program product of claim 9, wherein the trigger is a minimum amount of time in which no messages are exchanged between the at least two participants.

12. The computer program product of claim 9, wherein the event data is visually distinguished from messages within the annotated transcript.

13. The computer program product of claim 9, wherein the event data is included within the transcript only responsive to determining that a participant of the chat session associated with the event data has provided permission to share the event data.

14. The computer program product of claim 9, wherein the chat session is conducted by a messaging system and the event occurs within a different system from which the event data is obtained, wherein the server is further configured to initiate an executable operation comprising querying the different system for the event data.

* * * * *